United States Patent
Crestin et al.

(10) Patent No.: US 6,890,006 B2
(45) Date of Patent: May 10, 2005

(54) DEVICE FOR AXIALLY RETAINING A CYLINDRICAL ELEMENT AND MORE PARTICULARLY A CABLE

(75) Inventors: Joseph Crestin, Vanves (FR); Gilles Cordier, Joinville le Pont (FR)

(73) Assignee: Société d'Exploitation des Procédés Maréchal (SEPM), Saint Maurice Cedex (FR)

( * ) Notice: Subject to any disclaimer, the term of this patent is extended or adjusted under 35 U.S.C. 154(b) by 0 days.

(21) Appl. No.: 10/088,645

(22) PCT Filed: Jul. 12, 2001

(86) PCT No.: PCT/FR01/02248
§ 371 (c)(1),
(2), (4) Date: Apr. 18, 2002

(87) PCT Pub. No.: WO02/09250
PCT Pub. Date: Jan. 31, 2002

(65) Prior Publication Data
US 2003/0085575 A1 May 8, 2003

(30) Foreign Application Priority Data
Jul. 21, 2000 (FR) ............................................ 00 09608

(51) Int. Cl.⁷ .............................................. F16L 17/00
(52) U.S. Cl. ........................ 285/342; 285/243; 285/323
(58) Field of Search ................................ 285/243, 322, 285/324, 323, 246, 247, 248, 249, 353, 354, 340, 342, 382.7, 149.1, 150.1, 151.1

(56) References Cited

U.S. PATENT DOCUMENTS

| | | | | |
|---|---|---|---|---|
| 3,659,880 A | * | 5/1972 | Goldsobel | 285/149.1 |
| 3,980,325 A | * | 9/1976 | Robertson | 285/249 |
| 4,145,075 A | | 3/1979 | Holzmann | |
| 4,250,348 A | * | 2/1981 | Kitagawa | 285/322 |
| 4,358,079 A | * | 11/1982 | Navarro | 285/151.1 |
| 5,048,872 A | | 9/1991 | Gehring | |
| 5,072,072 A | * | 12/1991 | Bawa et al. | 285/151.1 |
| 5,321,205 A | | 6/1994 | Bawa et al. | |
| 5,763,833 A | | 6/1998 | Bawa et al. | |
| 5,866,853 A | * | 2/1999 | Sheehan | 285/149.1 |
| 6,162,995 A | * | 12/2000 | Bachle et al. | 285/322 |

FOREIGN PATENT DOCUMENTS

| | | | | |
|---|---|---|---|---|
| AU | 0236396 | * | 10/1959 | 285/342 |
| DE | 0270219 | * | 2/1914 | 285/342 |
| DE | 19738517 | | 11/1998 | |
| EP | 0381980 | | 8/1990 | |
| FR | 2358766 | | 7/1977 | |

* cited by examiner

*Primary Examiner*—Aaron Dunwoody
(74) *Attorney, Agent, or Firm*—Greenblum & Bernstein, P.L.C.

(57) ABSTRACT

Device for axial maintenance of a cylindrical element, wherein the device includes a coupling bushing comprising external threads, first nut strips which extend axially beyond the external threads, and a first internal pressure surface. A covering nut is provided which includes a second internal pressure surface configured to engage and deform ends of the first nut strips radially indwardly and towards the cylindrical element when the cylindrical element is introduced into the coupling bushing and the covering nut. A sleeve is also provided which includes second nut strips and an external diameter which is at most equal to an internal diameter of the coupling bushing, whereby the sleeve, with the second nut strips being introduced first, is adapted to be introduced into the coupling bushing. The first internal pressure surface is configured to engage and deform ends of the second nut strips radially indwardly and towards the cylindrical element when the cylindrical element is introduced into the coupling bushing and the covering nut.

23 Claims, 3 Drawing Sheets

DEVICE FOR AXIALLY RETAINING A CYLINDRICAL ELEMENT AND MORE PARTICULARLY A CABLE

CROSS-REFERENCE TO RELATED APPLICATIONS

The present application is a National Stage Application of International Application No. PCT/FR01/02248, filed Jul. 12, 2001. Further, the present application claims priority under 35 U.S.C. § 119 of French Patent Application No. 00/09608 filed on Jul. 21, 2000.

BACKGROUND OF THE INVENTION

1. Field of the Invention

The present invention relates to a device for axial maintenance of a cylindrical element and more particularly a cable.

2. Discussion of Background Information

For fixing a cylindrical element into another element, such as for example, an electric cable into the coupling bushing of a plug or electricity socket, or furthermore, for example, into a conduit, a tube or pipe in an apparatus or accessory, it is known how to use devices which maintain said cylindrical element against traction efforts.

For this, a device for axial maintenance is known comprising an axial maintenance device for a cylindrical element and more particularly for a cable, comprising a coupling bushing which is threaded externally and which is prolonged in the axial direction by tightening nut strips, and a covering nut comprising internally a reduced pressure surface intended to act on the ends of the nut strips of the coupling bushing and to deform them radially towards the cylindrical element previously introduced into said coupling bushing after crossing said nut.

This type of device is, for example, described in the French patent 2358766 or again in the European patent 0381980.

In the French patent cited above, the device furthermore comprises a packing seal and thus constitutes both a compression gland or stuffing box.

In this device known in prior art, the packing deforms into a truncated cone and the adhesion of the cable is active over a limited length.

Furthermore, the deformation of the packing is not well contained internally and each device can only concern a restricted number of elements to fix, in a relatively reduced range of diameters.

Finally, in such a device, there cannot be any strip anchoring in the element to be held since any traction on the latter tends to separate said strips.

SUMMARY OF THE INVENTION

Among other things, the invention makes it possible to improve the traction resistance performances of this type of device, especially in order to fulfil the anti-deflagration standards relative to the domain of electrical apparatuses.

In order to do this, a device according to the invention of the type described above is particularly notable in that it further comprises a sleeve also provided with nut strips and whose external diameter is at most equal to the internal diameter of the coupling bushing in which said sleeve is intended to be introduced beginning by said strips with which it is provided. The coupling bushing is further provided internally with a reduced pressure surface, which is intended to act on the nut strips of the sleeve.

According to an embodiment, the pressure surface of the coupling bushing and the sleeve are dimensioned so that the strips of said sleeve anchor into the cylindrical element during the tightening of the nut.

In order to ensure tightness, the invention envisages an embodiment which is provided with a tubular sealing packing intended to be inserted in final position between the cylindrical element, the sleeve and the coupling bushing strips.

For example, in this case, the sealing packing is in two parts of different external diameters, the smallest external diameter corresponding substantially to the internal diameter of the sleeve and the biggest diameter corresponding substantially to the internal diameter of the coupling bushing.

A device according to the invention which remains compact and which only requires a single screwing operation also makes it possible to ensure, with a single device, both the anchoring and the sealing of various cables in a large range of diameters, which simplifies the choice of the user, limits storage problems and raises manufacturing volumes, thus reducing production costs.

The invention also provides for a device for axial maintenance of a cylindrical element, wherein the device comprises a coupling bushing comprising external threads, first nut strips which extend axially beyond the external threads, and a first internal pressure surface. A covering nut is provided which comprises a second internal pressure surface configured to engage and deform ends of the first nut strips radially inwardly and towards the cylindrical element when the cylindrical element is introduced into the coupling bushing and the covering nut. A sleeve is also provided which comprises second nut strips and an external diameter which is at most equal to an internal diameter of the coupling bushing, whereby the sleeve, with the second nut strips being introduced first, is adapted to be introduced into the coupling bushing. The first internal pressure surface is configured to engage and deform ends of the second nut strips radially inwardly and towards the cylindrical element when the cylindrical element is introduced into the coupling bushing and the covering nut.

The cylindrical element may comprise a cable. The first and second internal pressure surfaces may be configured to cause the first and second nut strips to be anchored in the cylindrical element when the covering nut is tightened. The first and second internal pressure surfaces may comprise tapered surfaces. The first and second internal pressure surfaces may comprise tapered surfaces which face in opposite directions.

The device may further comprise a tubular packing seal adapted to be inserted in, a final assembled position, between the cylindrical element and the sleeve. The device may further comprise a tubular packing seal adapted to be inserted in, a final assembled position, between the cylindrical element and the first nut strips. The device may further comprise a packing seal adapted to slide over the cylindrical element and into the sleeve. The packing seal mat comprise a first part having a first external diameter and a second part having a different second external diameter. The first diameter may be smaller than the second diameter, wherein the first diameter corresponds substantially to an internal diameter of the sleeve, and wherein the second diameter corresponds substantially to the internal diameter of the coupling bushing.

The covering nut may comprise internal threads configured to threadably engage the external threads of the coupling bushing.

The invention also provides for a method of fixing the cylindrical element using the device described above, wherein the method comprises arranging the coupling bushing on the cylindrical element with the first nut strips facing in a first direction, arranging the sleeve on the cylindrical element with the second nut strips facing in a second opposite direction, arranging the covering nut on the cylindrical element, moving the covering nut towards the coupling bushing, engaging and deforming ends of the second nut strips radially inwardly with the first internal pressure surface by moving the covering nut towards the coupling bushing, threadably engaging internal threads of the covering nut and the external threads of the coupling bushing, and engaging and deforming ends of the first nut strips radially inwardly with the second internal pressure surface by moving the covering nut further towards the coupling bushing.

The invention also provides for a device for fixing a cable to a plug or a socket, wherein the device comprises a coupling bushing comprising external threads, first strips which extend axially from one end of the coupling bushing, and a first internal tapered pressure surface. A nut is provided which comprises internal threads and a second internal tapered pressure surface configured to engage and deform ends of the first strips radially inwardly. The internal threads of the nut are configured to threadably engage the external threads of the coupling bushing. A sleeve is provided which comprises second strips which extend axially from one end of the sleeve. The sleeve is configured to slide within the coupling bushing. The first internal tapered pressure surface is configured to engage and deform ends of the second strips radially inwardly when the nut moves towards the coupling bushing.

The first and second internal tapered pressure surfaces may be configured to cause the first and second strips to be anchored in the cable when the nut is tightened onto the coupling bushing. The first and second internal tapered pressure surfaces may face in opposite directions.

The device may further comprise a tubular packing seal adapted to be inserted between the cable and the sleeve. The device may further comprise a tubular packing seal adapted to be inserted between the cable and the first strips. The device may further comprise a packing seal adapted to slide over the cable and into the sleeve. The packing seal may comprise a first part having a first external diameter and a second part having a different second external diameter. The first diameter may be smaller than the second diameter, wherein the first diameter corresponds substantially to an internal diameter of the sleeve, and wherein the second diameter corresponds substantially to the internal diameter of the coupling bushing.

The invention also provides for a method of fixing a cable to a plug or a socket using the device described above, wherein the method comprises arranging the coupling bushing on the cable with the first strips facing in a first direction, arranging the sleeve on the cable with the second strips facing in a second opposite direction, arranging the nut on the cable, moving the nut towards the coupling bushing, engaging and deforming ends of the second strips radially inwardly with the first internal tapered pressure surface by moving the nut towards the coupling bushing, threadably engaging the internal threads of the nut and the external threads of the coupling bushing, and engaging and deforming ends of the first strips radially inwardly with the second internal tapered pressure surface by moving the nut further towards the coupling bushing.

The invention also provides for a device for fixing a cable to a plug or a socket, wherein the device comprises a coupling bushing comprising external threads, first strips which extend axially from one end of the coupling bushing, and a first internal tapered pressure surface. A nut comprises internal threads and a second internal tapered pressure surface configured to engage and deform ends of the first strips radially inwardly. The internal threads of the nut is configured to threadably engage the external threads of the coupling bushing. A sleeve comprises second strips which extend axially from one end of the sleeve. The sleeve is configured to slide within the coupling bushing. A tubular packing seal is adapted to be inserted partially into the sleeve and the coupling bushing. The first internal tapered pressure surface is configured to engage and deform ends of the second strips radially inwardly when the nut moves towards the coupling bushing.

The invention also provides for a method of fixing a cable to a plug or a socket using the device described above, wherein the method comprises arranging the coupling bushing on the cable with the first strips facing in a first direction, arranging the sleeve on the cable with the second strips facing in a second opposite direction, arranging the tubular packing seal on the cable, arranging the nut on the cable, moving the nut towards the packing seal until the second internal tapered surface engages the packing seal, causing the sleeve and the packing seal to slide into the coupling bushing, moving the nut towards the coupling bushing, engaging and deforming ends of the second strips radially inwardly with the first internal tapered pressure surface by moving the nut and the packing seal towards the coupling bushing, threadably engaging the internal threads of the nut and the external threads of the coupling bushing, and engaging and deforming ends of the first strips radially inwardly with the second internal tapered pressure surface by moving the nut further towards the coupling bushing.

BRIEF DESCRIPTION OF THE DRAWINGS

The invention will be better understood and other particularities will become clear by reading the following description which refers to the attached drawings in which.

DETAILED DESCRIPTION OF THE INVENTION

Figure 1:
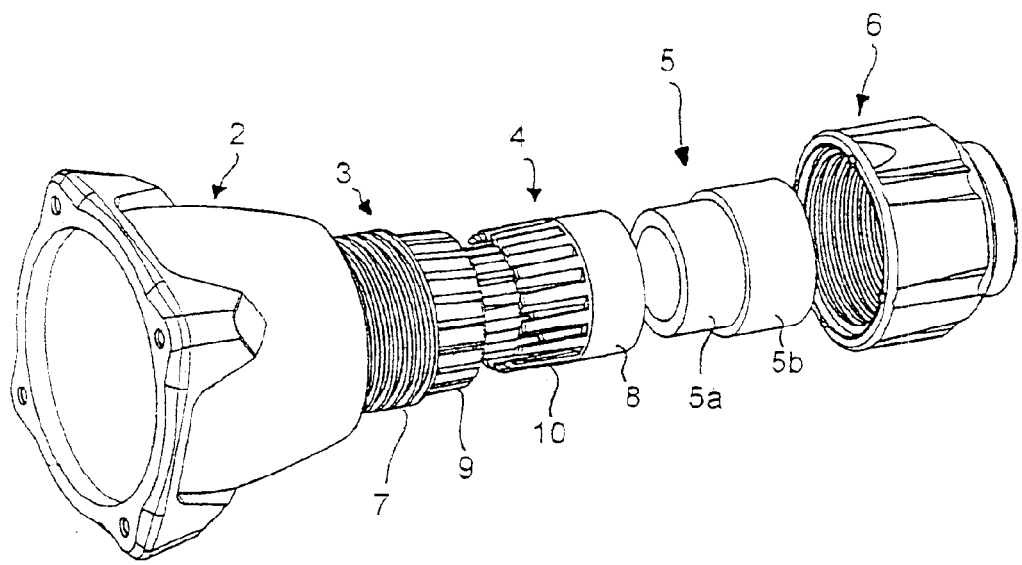
FIG. 1 shows an exploded view of a device according to the invention.

The figures represent a device according to the invention intended to fix, in the example shown, an electric cable 1 (FIGS. 3 to 6) in a bush 2 of an electrical connection system (coupling bushing of a plug or mobile plug or of an extension or connector etc.)

The device according to the invention comprises a coupling bushing 3 integral with the bush 2, a sleeve 4, a packing seal 5 in rubber and a ring shaped nut 6.

As shown clearly in the diagrams, the coupling bushing 3 and the sleeve 4 are provided with a base 7 and a base 8 respectively, prolonged by strips 9 and 10 respectively which protrude externally in the axial direction. The strips 10 of the sleeve 4 are positioned for assembly, as explained below, towards the strips 9 of the coupling bushing 3 (FIGS.

1 and 2). The base 7 of the coupling bushing 3 is further provided with an external threading as shown in the drawings. This external threading is intended to co-operate with the internal threading of the nut 6.

At the base of its threading, the nut 6 has an internal pressure surface 11 reduced, for example, in truncated form whose function will be explained below.

In the same way, the base of the coupling bushing 3 is, on the opposite side from the strips 9, provided with a reduced internal pressure surface 12.

As shown clearly in the drawings, the packing 5 has two parts 5a and 5b in steps of different external diameters.

The smallest external diameter (part 5a) of the packing 5 corresponds substantially to the internal diameter of the base 8 of the sleeve 4 and the biggest diameter (part 5b) corresponds substantially to the internal diameter of the strips 9 of the coupling bushing 3 before deformation, while the external diameter of said sleeve 4 is substantially equal to the internal diameter of the coupling bushing 3.

The drawings show clearly the way in which to assemble together the various elements of the device.

Figure 2:
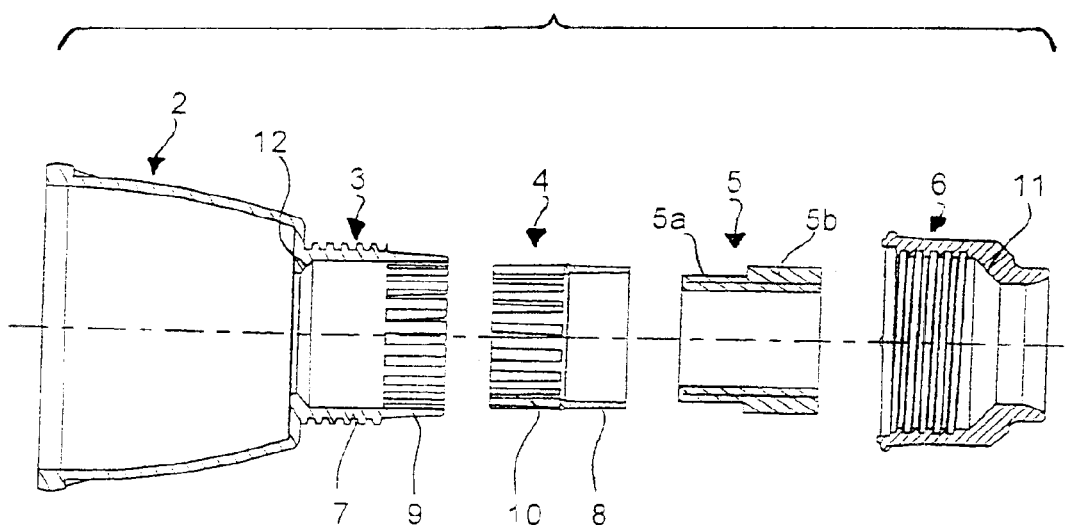
FIG. 2 shows an axial cross-section of the various elements to be assembled.

The elements are initially arranged as shown in FIGS. 1 and 2.

Figure 3:
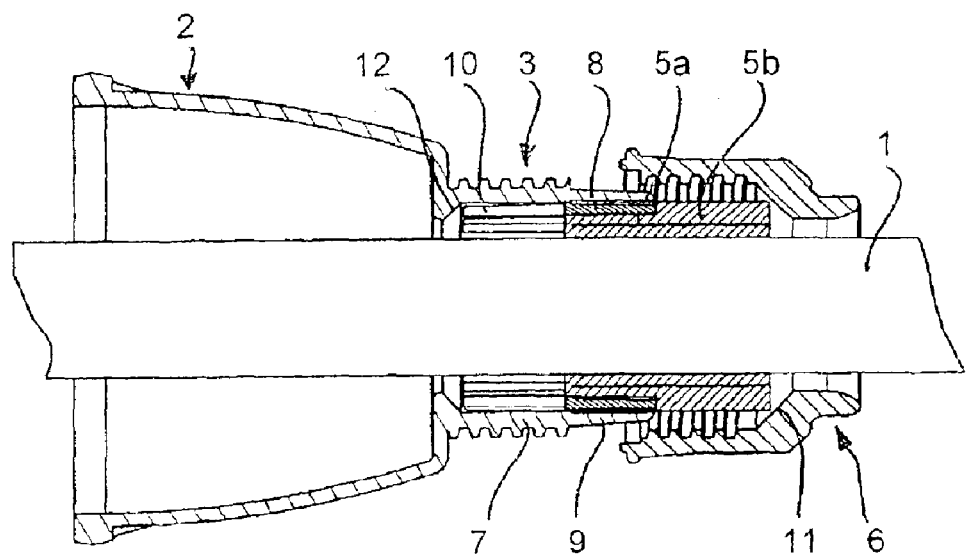
FIGS. 3, 4 and 5 show axial cross-sections of the device of FIGS. 1 and 2, respectively before screwing the nut, at the beginning of screwing and at the end of screwing.

Beginning from this assembly, the sleeve 4 is introduced by its strips into the coupling bushing 3, and after or before, the part 5a is introduced into the packing 5 in the base 8 of the sleeve 4 and the covering nut 6 is set in place on the strips 9 of the coupling bushing 3 in order to be in the position of FIG. 3.

Before or after this first assembly, the cable 1 is evidently introduced through all the elements (2, 3, 4, 5 and 6).

Figure 4:
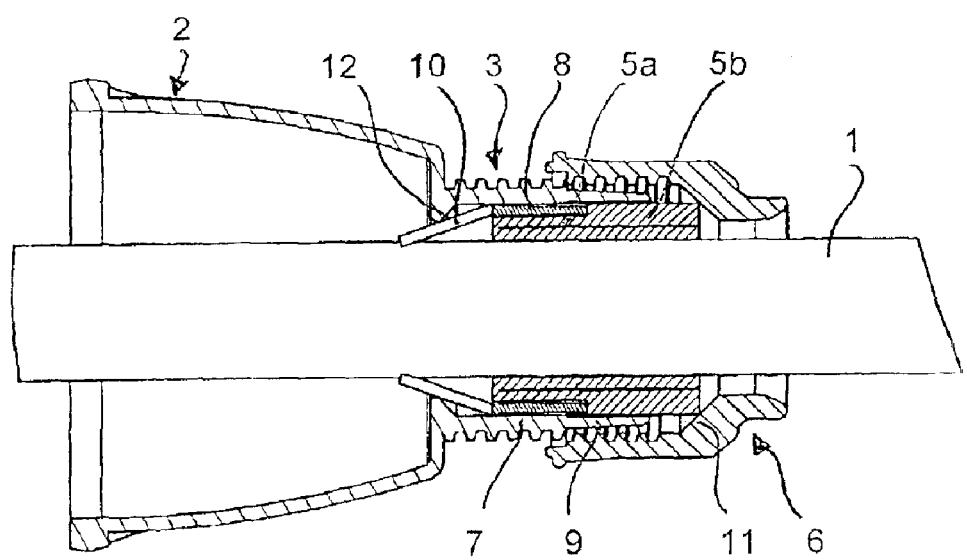

Starting from the position of FIG. 3, the nut 6 is pushed which itself pushes the packing assembly 5 and sleeve 4 until the strips 10 of the sleeve 4 are held radially by the pressure surface 12 of the coupling bushing 3 to be deformed and to be tightened onto the cable 1 as shown in FIG. 4.

Next the screwing of the nut 6 is carried out which accentuates the deformation of the strips 10. By continuing said screwing of the nut 6, the strips 9 of the coupling bushing 3 tighten radially on the packing 5 by deforming under the effect of the pressure surface 11 of said nut 6.

Figure 5:
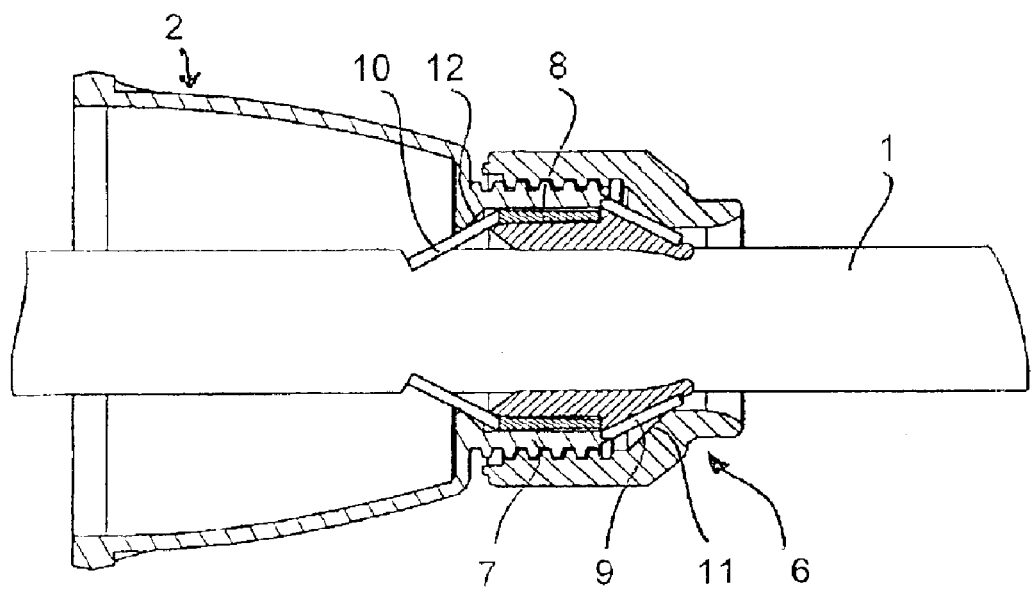

In the embodiment of FIGS. 1 to 5, the length of the sleeve 4 and the pressure surface 12 of the coupling bushing 3 are such that the strips 10 of said sleeve 4 are anchored at the end of screwing in the cable 1 as shown in FIG. 5.

Figure 6:
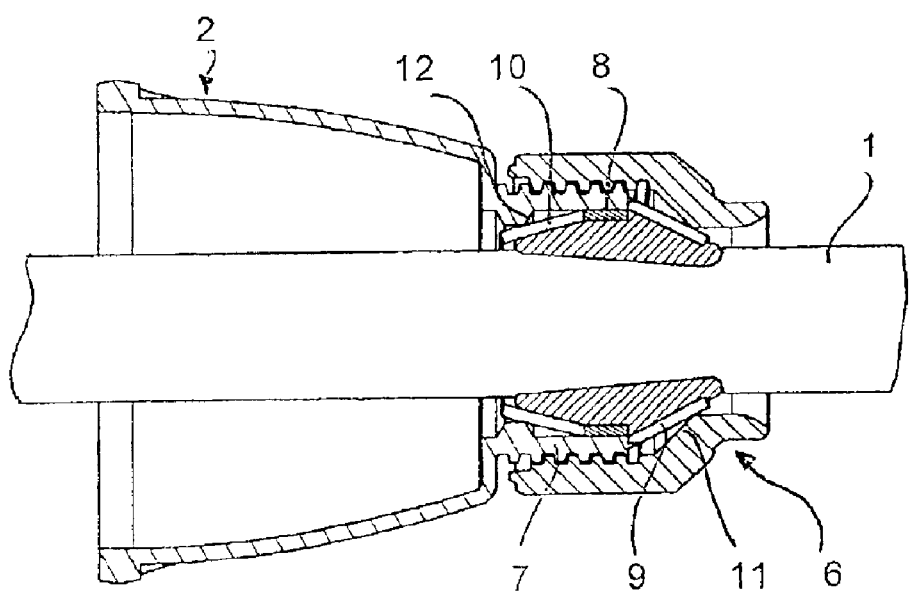
FIG. 6 shows a view corresponding to FIG. 5 according to another very slightly different embodiment.

In the embodiment of FIG. 6, the base 8 of the sleeve 4 is less long axially and/or the strips 10 are shorter as well as the pressure surface 12, in such a way that in this embodiment, said strips 10 do not anchor in the cable 1. Given that the differences of the sleeve and the surface 12 of the coupling bushing 3 of the device of FIG. 6, relative to the sleeve 4 and the coupling bushing 3 of FIGS. 1 to 5 are essentially dimensional, the same references have been kept on said figures.

On FIGS. 5 and 6, it can be seen that the packing 5 is perfectly compressed by the sleeve 4 and the strips 9 of the coupling bushing 3, and furthermore it is perfectly maintained between its two ends by the strips 9 and 10 of the coupling bushing 3 and the sleeve 4 respectively.

Compared to prior art, the invention enables a greater length of contact between the packing 5 and the cable 1 together with a greater volume of deformed packing, which increases the reliability of the sealing and retention, thus ensuring a greater reserve of elasticity to compensate for the relaxation of plastic parts intended to compress the packing.

The strips 9 of the coupling bushing 3 act on the packing 5 and the cable 1 in a classic way whereas the strips 10 of the sleeve 4 act in the opposite direction with, further, an anchoring or not, in the cable 1 (FIGS. 5 and 6 respectively).

Furthermore it can be understood that in the embodiment of FIGS. 1 to 5, any traction on the cable accentuates the anchoring of the sleeve 4, said anchoring thus being self-blocking.

If the embodiment relates in particular to an electric cable, it can evidently concern, as explained above, any cylindrical element.

What is claimed is:

1. A device for axially maintaining a cylindrical element, the device comprising:

a coupling bushing comprising external threads, first nut strips which extend axially beyond the external threads, and a first internal pressure surface;

a covering nut comprising a second internal pressure surface configured to engage and deform ends of the first nut strips radially inwardly and towards the cylindrical element when the cylindrical element is introduced into the coupling bushing and the covering nut; and a sleeve comprising second nut strips and an external diameter which is at most equal to an internal diameter of the coupling bushing, whereby the sleeve, with the second nut strips being introduced first, is adapted to be introduced into the coupling bushing, wherein the first internal pressure surface is configured to engage and deform ends of the second nut strips radially inwardly and towards the cylindrical element when the cylindrical element is introduced into the coupling bushing and the covering nut.

2. The device of claim 1, wherein the cylindrical element comprises a cable.

3. The device of claim 1, wherein the first and second internal pressure surfaces are configured to cause the first and second nut strips to be anchored in the cylindrical element when the covering nut is tightened.

4. The device of claim 1, wherein the first and second internal pressure surfaces comprise tapered surfaces.

5. The device of claim 1, wherein the first and second internal pressure surfaces comprise tapered surfaces which face in opposite directions.

6. The device of claim 1, further comprising a tubular packing seal adapted to be inserted in, a final assembled position, between the cylindrical element and the sleeve.

7. The device of claim 1, further comprising a tubular packing seal adapted to be inserted in, a final assembled position, between the cylindrical element and the first nut strips.

8. The device of claim 1, further comprising a packing seal adapted to slide over the cylindrical element and into the sleeve.

9. The device of claim 8, wherein the packing seal comprises a first part having a first external diameter and a second part having a different second external diameter.

10. The device of claim 9, wherein the first diameter is smaller than the second diameter, wherein the first diameter corresponds substantially to an internal diameter of the sleeve, and wherein the second diameter corresponds substantially to the internal diameter of the coupling bushing.

11. The device of claim 1, wherein the covering nut comprises internal threads configured to threadably engage the external threads of the coupling bushing.

12. A method of fixing the cylindrical element using the device of claim 1, the method comprising:

arranging the coupling bushing on the cylindrical element with the first nut strips facing in a first direction;

arranging the sleeve on the cylindrical element with the second nut strips facing in a second opposite direction;

arranging the covering nut on the cylindrical element;

moving the covering nut towards the coupling bushing;

engaging and deforming ends of the second nut strips radially inwardly with the first internal pressure surface by moving the covering nut towards the coupling bushing;

threadably engaging internal threads of the covering nut and the external threads of the coupling bushing; and engaging and deforming ends of the first nut strips radially inwardly with the second internal pressure surface by moving the covering nut further towards the coupling bushing.

13. A device for fixing a cable to a plug or a socket, the device comprising:

a coupling bushing comprising external threads, first strips which extend axially from one end of the coupling bushing, and a first internal tapered pressure surface;

a nut comprising internal threads and a second internal tapered pressure surface configured to engage and deform ends of the first strips radially inwardly;

the internal threads of the nut being configured to threadably engage the external threads of the coupling bushing;

a sleeve comprising second strips which extend axially from one end of the sleeve; and the sleeve being configured to slide within the coupling bushing, wherein the first internal tapered pressure surface is configured to engage and deform ends of the second strips radially inwardly when the nut moves towards the coupling bushing.

14. The device of claim 13, wherein the first and second internal tapered pressure surfaces are configured to cause the first and second strips to be anchored in the cable when the nut is tightened onto the coupling bushing.

15. The device of claim 13, wherein the first and second internal tapered pressure surfaces face in opposite directions.

16. The device of claim 13, further comprising a tubular packing seal adapted to be inserted between the cable and the sleeve.

17. The device of claim 13, further comprising a tubular packing seal adapted to be inserted between the cable and the first strips.

18. The device of claim 13, further comprising a packing seal adapted to slide over the cable and into the sleeve.

19. The device of claim 18, wherein the packing seal comprises a first part having a first external diameter and a second part having a different second external diameter.

20. The device of claim 19, wherein the first diameter is smaller than the second diameter, wherein the first diameter corresponds substantially to an internal diameter of the sleeve, and wherein the second diameter corresponds substantially to the internal diameter of the coupling bushing.

21. A method of fixing a cable to a plug or a socket using the device of claim 13, the method comprising:

arranging the coupling bushing on the cable with the first strips facing in a first direction;

arranging the sleeve on the cable with the second strips facing in a second opposite direction;

arranging the nut on the cable;

moving the nut towards the coupling bushing;

engaging and deforming ends of the second strips radially inwardly with the first internal tapered pressure surface by moving the nut towards the coupling bushing;

threadably engaging the internal threads of the nut and the external threads of the coupling bushing; and engaging and deforming ends of the first strips radially inwardly with the second internal tapered pressure surface by moving the nut further towards the coupling bushing.

22. A device for fixing a cable to a plug or a socket, the device comprising:

a coupling bushing comprising external threads, first strips which extend axially from one end of the coupling bushing, and a first internal tapered pressure surface;

a nut comprising internal threads and a second internal tapered pressure surface configured to engage and deform ends of the first strips radially inwardly;

the internal threads of the nut being configured to threadably engage the external threads of the coupling bushing;

a sleeve comprising second strips which extend axially from one end of the sleeve;

the sleeve being configured to slide within the coupling bushing; and a tubular packing seal adapted to be inserted partially into the sleeve and the coupling bushing, wherein the first internal tapered pressure surface is configured to engage and deform ends of the second strips radially inwardly when the nut moves towards the coupling bushing.

23. A method of fixing a cable to a plug or a socket using the device of claim 22, the method comprising:

arranging the coupling bushing on the cable with the first strips facing in a first direction;

arranging the sleeve on the cable with the second strips facing in a second opposite direction;

arranging the tubular packing seal on the cable;

arranging the nut on the cable;

moving the nut towards the packing seal until the second internal tapered surface engages the packing seal;

causing the sleeve and the packing seal to slide into the coupling bushing;

moving the nut towards the coupling bushing;

engaging and deforming ends of the second strips radially inwardly with the first internal tapered pressure surface by moving the nut and the packing seal towards the coupling bushing;

threadably engaging the internal threads of the nut and the external threads of the coupling bushing; and engaging and deforming ends of the first strips radially inwardly with the second internal tapered pressure surface by moving the nut further towards the coupling bushing.

* * * * *